United States Patent [19]

Tanuma

[11] Patent Number: 4,958,356
[45] Date of Patent: Sep. 18, 1990

[54] EXCIMER LASER APPARATUS
[75] Inventor: Ryohei Tanuma, Kanawa, Japan
[73] Assignee: Fuji Electric Co., Ltd., Kawasaki, Japan
[21] Appl. No.: 416,964
[22] Filed: Oct. 4, 1989
[30] Foreign Application Priority Data Oct. 4, 1988 [JP] Japan ................................ 63-250152

[51] Int. Cl.$^5$ .............................................. H01S 3/22
[52] U.S. Cl. ........................................ 372/59; 372/57; 372/58
[58] Field of Search ........................ 372/57, 58, 59, 60
[56] References Cited
U.S. PATENT DOCUMENTS 4,317,087 2/1982 Sander et al. ......................... 372/59
4,661,963 4/1987 Liu et al. .............................. 372/59
4,674,099 6/1987 Turner ................................. 372/57
4,740,982 4/1988 Hakuta et al. ........................ 372/57

OTHER PUBLICATIONS

Lifetime extension of XeCl and KrCl lasers with additives by T. J. McKee et al., pp. 943-945, Jun. 15, 1980.

*Primary Examiner*—Frank Gonzalez
*Assistant Examiner*—Susan S. Morse
*Attorney, Agent, or Firm*—Brumbaugh, Graves, Donohue & Raymond

[57] ABSTRACT

An excimer laser apparatus with an HCl generator. The HCl generator is constructed so that HCl gas is generated by the reaction of a fixed concentration of hydrogen gas in the laser gas mixture with an equivalent amount of metallic chlorides. The reaction occurs at a preset temperature, and the metallic chlorides may be either in the laser gas chamber or in the circulation line of the laser gas. Consequently, the HCl required for laser generation is continuously formed by the $H_2$ reduction of the metallic chlorides. The HCl loss due to the formation of impurities is automatically replenished to maintain a constant concentration of HCl in the laser gas, which results in stable laser generation. This simplified and dependable excimer laser apparatus can be operated continuously for a long time, since it is not necessary to measure and replenish the HCl lost due to the formation of impurities. Furthermore, instead of using a bomb for the highly toxic HCl gas, a bomb for He mixed with $H_2$ carrier gas, which has a much lower explosion limit, can be used for this safe excimer laser apparatus.

8 Claims, 3 Drawing Sheets

EXCIMER LASER APPARATUS

BACKGROUND OF THE INVENTION

The present invention relates to an excimer laser apparatus that uses r-are gases and hydrogen chloride gas as laser media for the emission of ultraviolet light. The apparatus includes a hydrogen chloride generator for supplying hydrogen chloride at a level appropriate for safe and efficient operation of the laser.

Excimer lasers are gas lasers which emit ultraviolet light in the range of 200–300 nm. In general, rare gas atoms, including argon (Ar), krypton (Kr), and xenon (Xe), are combined in their excited state with halogen atoms of fluorine (F), and chlorine (Cl) etc. to form a laser activator-excimer. When xenon (Xe) and chlorine (Cl) are combined, the resulting excimer laser has high emission efficiency, and therefore, is one of the most practical excimer lasers.

One of the greatest problems with a laser of this type is that the laser gas has a high reactivity and it reacts with the construction materials of the laser apparatus to degrade the quality of the laser gas. Generally, hydrogen chloride is used as a chlorine donor in the XeCl excimer laser. Chlorine ($Cl_2$) is not used because it absorbs light of the laser emission wavelength of 380 nm.

The HCl and Cl atoms or Cl radicals generated during the production of the laser emission react with metallic materials to generate metal chlorides such as aluminum chloride ($AlCl_3$) and ferric chloride ($FeCl_3$), or react with plastic materials and O rings to generate carbon tetrachloride ($CCl_4$) The laser light produced is also absorbed by these vaporized impurities. Further, the impurities will foul the laser window. Therefore, the impurities reduce the gas life of the XeCl excimer laser to the range of $10^7$ shots. Since a range of the $10^9$ shots is required for continuous operation in practical applications, the problem of the laser gas degradation must be solved for the excimer laser to become useful in industrial applications.

One solution to the problem of laser gas degradation is to cold trap the impurities, and then add a suitable amount of HCl. The impurities can be cold trapped because their vapor pressure is generally lower than that of Xe and HCl, and this purification method can extend the life of the laser gas.

The problem, however, with this method is determining the amount of HCl trapped and thus the amount of HCl to be added to maintain a concentration suitable for emission. Existing HCl testers are not dependable enough to be used for this purpose. In addition, the automatic supply of HCl from a gas supply bomb is dangerous because of its high toxicity, and there are other problems such as storing the HCl in the bomb, and the large ventilation equipment required.

Accordingly, this invention aims at solving the deficiencies of the XeCl excimer laser resulting from the supply of HCl. An object of this invention is to provide an excimer laser apparatus which has a safe, simple supply means of HCl so that the concentration of HCl may be automatically maintained at an appropriate level for a laser emission.

SUMMARY OF THE INVENTION

The excimer laser apparatus of this invention uses rare gases and hydrogen chloride gas as the laser media. Hydrogen chloride is generated by the reaction of metallic chlorides and hydrogen in a hydrogen chloride generator, which is part of the excimer laser apparatus. To control amount of the HCl present, the supply gas contains $H_2$ in an amount which, when converted in the hydrogen chloride generator, will provide an appropriate amount of HCl.

The hydrogen chloride generator (HCl generator) is connected as part of a recirculation loop for the laser gas. The HCl generator generates hydrogen chloride from the reactions between $H_2$ in the laser gas and a solid or molten metallic chloride. The hydrogen chloride is generated in an amount corresponding to the concentration of hydrogen in the laser gas. When the amount of hydrogen chloride in the laser gas is reduced by reacting with the construction materials of the laser apparatus hydrogen gas is liberated. The hydrogen gas is separated from impurities in a cold trap and then again reacts the with metallic chlorides to generate additional hydrogen chloride. With this arrangement, an approximately constant hydrogen chloride concentration is maintained in the laser gas until the chlorine in the metallic chlorides is consumed. At the same time, the safety of the excimer laser apparatus is greatly improved because the highly reactive hydrogen chloride gas is no longer stored or supplied outside of the system.

DESCRIPTION OF THE PREFERRED EMBODIMENT

Figure 2:
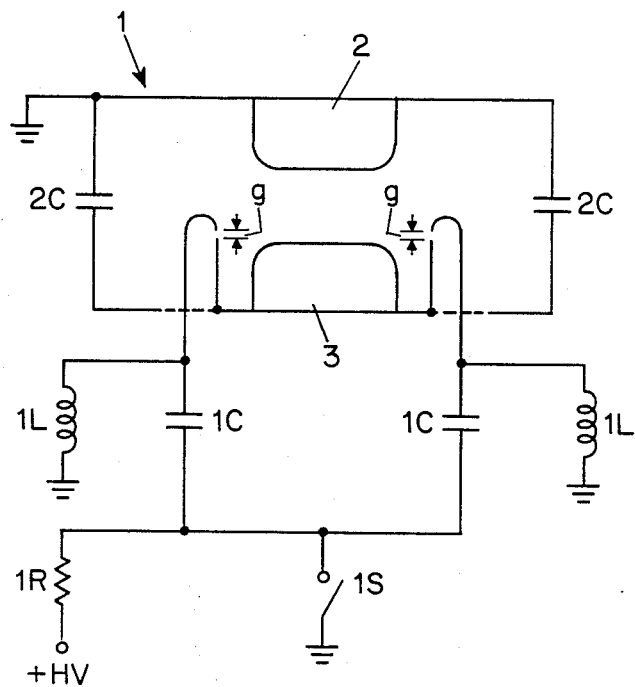
FIG. 2 describes the principal of the laser chamber.

In an excimer laser apparatus, either electronic rays or electric discharge may be used for exciting the excimer laser. Only an electronic discharge, however, has been used in practice. FIG. 2 shows an electric discharge circuit of an automatic pre-ionization type.

Referring to FIG. 2, which describes the principle of the laser chamber, condenser 1C is charged from a high voltage source +HV through the resister 1R. When switch 1S is closed, the load of 1C is shifted to condenser 2C. When a small gap g is made in the circuit between 1C and 2C, an arc discharge occurs during the load shifting. The ultraviolet light discharged from the arc pre-ionizes the laser gas between the primary electrodes, 2 (anode) and 3 (cathode). As the voltage of 2C reaches the initial discharge voltage, a glow discharge or primary discharge begins. This primary discharge excites the laser gas and emits the laser.

Figure 1:
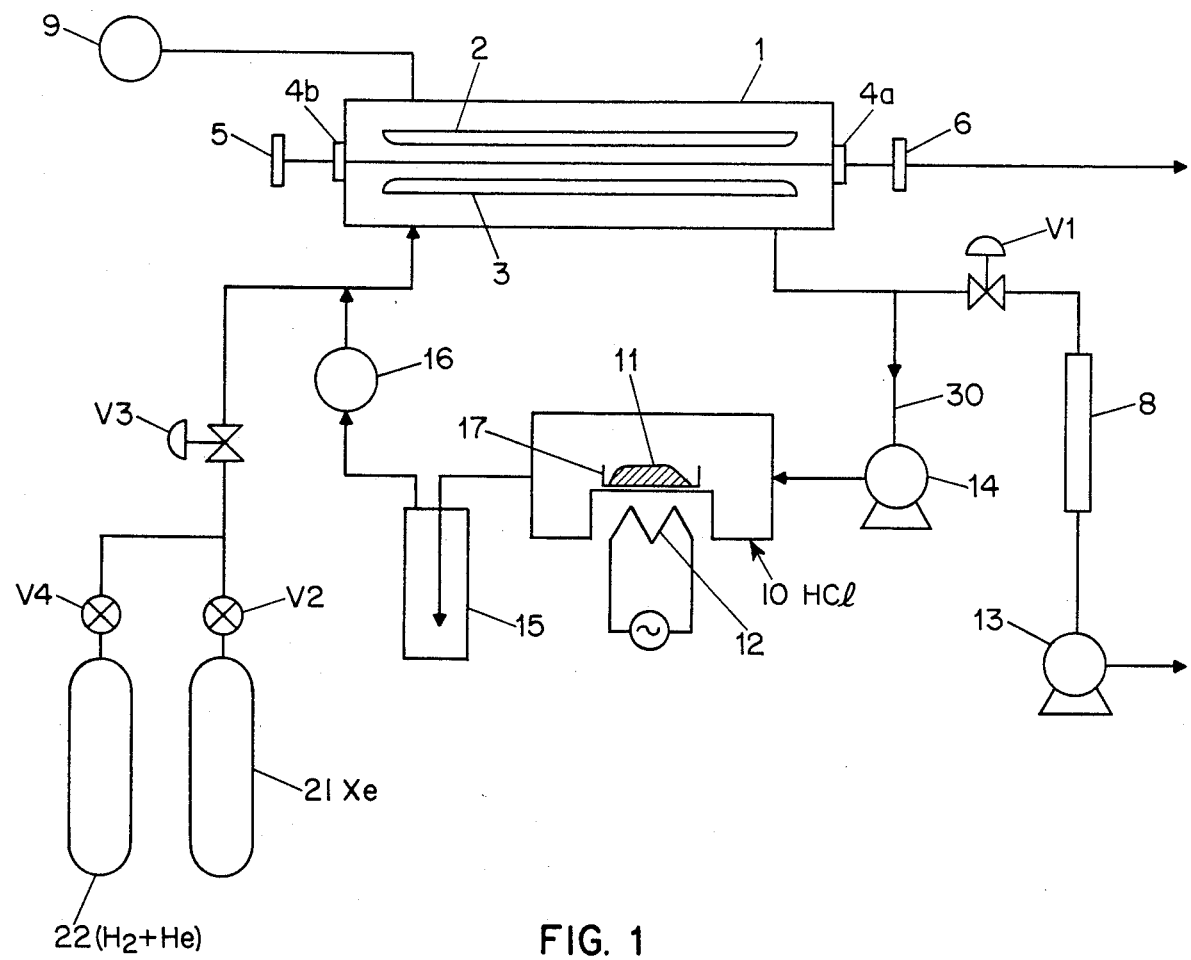
FIG. 1 shows the general construction of the apparatus.

Referring now to FIG. 1, the anode 2, and the cathode 3, are in the shape of rods and located in laser chamber 1. They are positioned parallel in the chamber, and the laser beam passes between them.

Generally, the pulse repetition rate of the excimer laser is raised by keeping fresh laser gas in the chamber. This is accomplished by maintaining a high circulation rate of the laser gas. In this embodiment, the gas in the chamber is circulated with a cross fan (not shown). The laser beam, from optical windows 4a and 4b, is then emitted back and forth between totally reflective mirror 5 and output mirror 6.

The mechanism of the laser gas generation of this invention is described based on FIG. 1 in accordance with the operating sequence. Silver chloride 11 is charged into the holder 17 of HCl generator 10. First, valve V1 is opened and the air and moisture is sufficiently eliminated from chamber 1 and the gas circulation line by rotary pump 13 through halogen filter 8. Pressure valve V2 of Xe bomb 21 is then opened and flow control valve V3 is operated to maintain the pressure in the chamber to a preset value of approximately 30 torr (at standard temperature, 25° C.). The pressure adjustment is done with pressure gauge 9. Pressure reducing valve V4 of bomb 22, which contains 0.07% hydrogen in helium (He) gas, is then opened. Valve V3 is adjusted to maintain the pressure in the chamber to about 3 atm with a gas mixture of $H_2$ and He. At this point, the concentration of $H_2$ is sufficient to exert about 1.5 torr (at standard temperature).

The temperature of cold trap 15 is set at $-100°$ to $-150°$ C. The temperature of cold trap is adjusted by cooling the trap with liquid nitrogen.

The AgCl 11 in HCl generator 10 is heated to 400° C. with heater 12. As gas circulation pump 14 is started causing gas to flow through recirculation loop 30, $H_2$ reacts with AgCl to form a concentration of HCl sufficient to exert approximately 3 torr (at standard temperature). A laser beam of 308 nm wave length is emitted when electricity is supplied.

Circulation pump 14 is operated continuously during the laser operation. The gas impurities that are generated are condensed and removed with cold trap 15. The dust is removed with filter 16. Since the remaining $H_2$, which corresponds to the amount of impurities, again reacts with AgCl to form more HCl, the HCl concentration in laser gas 30 is kept constant and the laser power is maintained at a fixed value. The operation of the laser can continue until all the chlorine in AgCl is consumed.

Thus, a highly safe apparatus without an external supply of highly toxic hydrogen chloride is obtained. The primary objective of the example set forth above is to provide for long term continuous operation. For a short operating period, however, cold trap 15 and filter 16 may not be needed. The metallic chlorides may also be charged into the laser chamber.

The following is a discussion of the selection of metallic chlorides usable for the apparatus of this invention. The HCl gas generator in this invention generates HCl by reducing metallic chlorides with hydrogen gas. Accordingly, the metallic chlorides should desirably meet the following conditions: (1) the $H_2$ reduction is thermodynamically feasible, (2) the chemical is stable and easy to handle, and (3) the chemical is low priced.

Whether or not the $H_2$ reduction is thermodynamically feasible, condition (1). can be determined by calculating the standard formation Gibbs fee energy $\Delta G_f^0$ and standard entropy $S^0$ of the reactants. For instance, the following equation expresses the case with AgCl.

$$\text{AgCl} + \tfrac{1}{2} H_2 \rightarrow \text{Ag} + \text{HCl} \quad (1)$$

$\Delta G_f^0 = -109.8 \quad\quad 0 \rightarrow 0 \quad\quad -95.3$ $S^0 = 0.0962 \quad 0.131 \rightarrow 0.0426 \quad 0.189$ $\Delta G_f^0$ is in $KJ\,mol^{-1}$, and $S^0$ is in $KJK^{-1}\,mol^{-1}$.

Then, the standard free energy change $\Delta G^0$ and the standard entropy change $\Delta S^0$ are calculated as:

$$\Delta G^0 = -95.3 - (-109.8) = 14.5 \quad (2)$$

$$\Delta S^0 = 0.187 + 0.0426 - 0.0962 - \tfrac{1}{2} \times 0.0131 = 0.0679 \quad (3)$$

A positive $\Delta G^0$ means that no reaction occurs at the standard state of 25° C. at 1 atm. But if $\Delta S^0$ is positive, the equilibrium can be shifted toward the product side by raising the temperature T.

$$\left(\frac{\partial \Delta G}{\partial T}\right)_r = -\Delta S \quad (4)$$

Although $\Delta S$ is a function of temperature in the above formula, $\Delta S$ does not change much as the temperature changes. By taking Tc (°C.) as the abscissa and G as the ordinate, and extrapolating the straight line for slope $-\Delta S^0$ through Tc=25° C., $\Delta G = \Delta G^0$, toward the high temperature side, one can predict if $\Delta G$ will become negative by raising the temperature.

Figure 3:
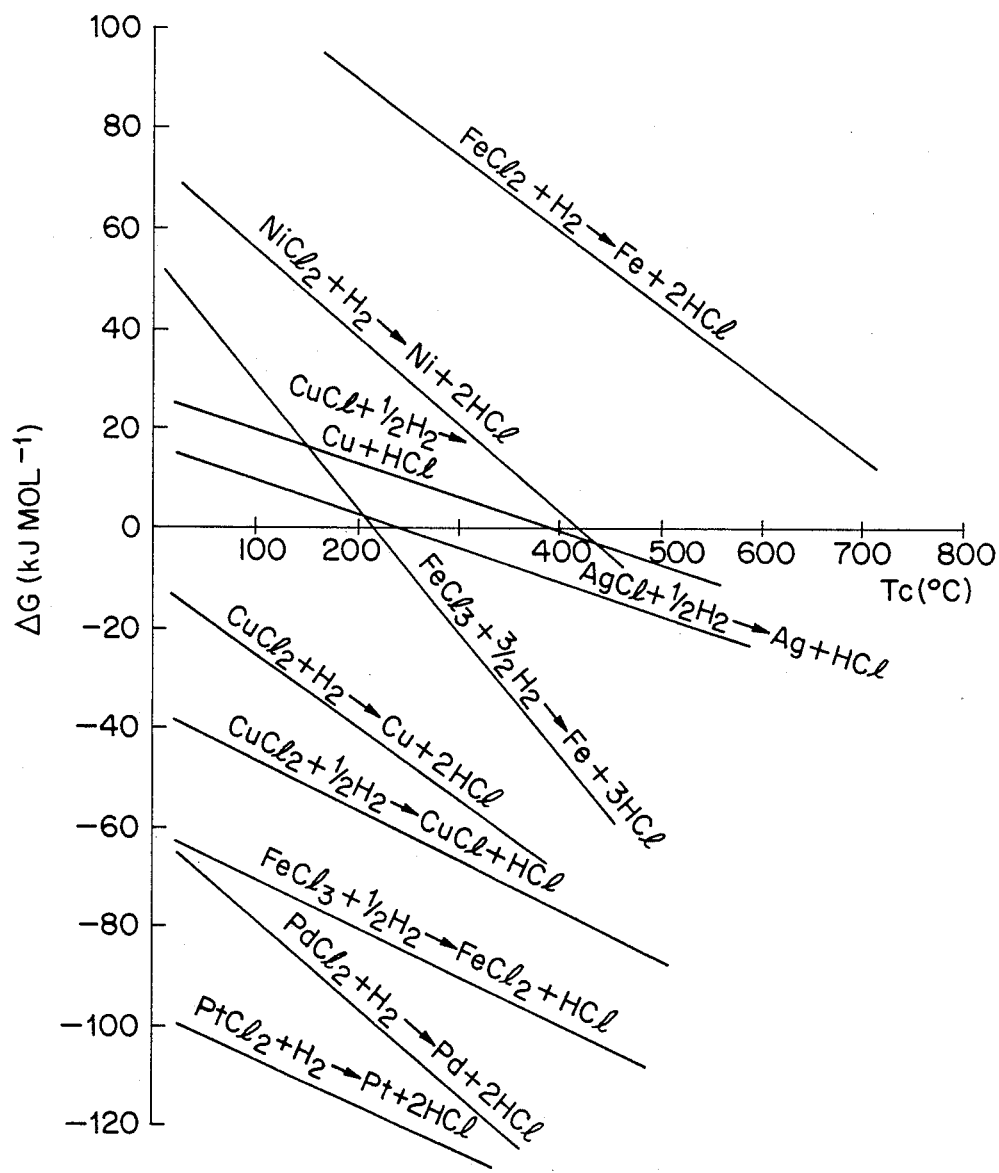
FIG. 3 shows the $\Delta G - T_c$ characteristic lines of various metallic chlorides.

FIG. 3 shows the $\Delta G$—Tc characteristic lines for various metallic chlorides. The straight line for AgCl intersects G=0 (abscissa) at about 240° C., and the equilibrium shifts toward the product side when this temperature is exceeded. $\Delta G$ is obtained from the following formula:

$$\Delta G = -RT \ln K_r \quad (5)$$
$$K_r = \frac{P_{HCl}}{\sqrt{P_{H_2}}}$$

R=Gas constant=0.008314 kj/K·mol
The equilibrium constant, Kp, of AgCl 11 at T=400° C. and $\Delta = -10.5$ kj is Kp=6.53. In the above formula, $P_{HCl}$ and $P_{H_2}$ are the partial pressures (in atm) of HCl and $H_2$. The partial pressures are based on 1 atm total pressure and if ideal gases are assumed, the equilibrium constant, Kp, is irrelevant to the total pressure.

If the $P_{HCl}$ of the XeCl excimer laser is $4 \times 10^{-3}$ atm (3 torr), then the $P_{H_2}$ is $3.75 \times 10^{-7}$ atm ($2.9 \times 10^{-4}$ torr). Under this condition, most of the $H_2$ is converted into Hcl.

Referring now to FIG. 3, the $\Delta G$—Tc characteristic lines for various compounds show that palatium chloride ($PtCl_2$), palladium chloride ($PCl_2$), ferric chloride ($FeCl_3$), cupric chloride ($CuCl_2$) and silver chloride (AgCl) re advantageous to the $H_2$ reduction. Cuprous chloride (CuCl) and nickel chloride ($NiCl_2$) can also be used at slightly higher temperatures Ruthenium chloride ($RuCl_2$) and rhodium chloride ($RhCl_2$) can also be used in practical $H_2$ reduction though there are no $\Delta G_f^0$ and $S^0$ data for the thermodynamic study.

Once a compound that meets condition (2), stability and easy handling, has been selected, the compound's hygroscopicity should then be considered If the compound is hygroscopic, the apparatus will absorb moisture from the atmosphere, and thereby initiate the side reactions, or cause corrosion due to the moisture discharge. Of the aforementioned compounds, $FeCl_3$, and $CuCl_2$ are very hygroscopic. $FeCl_2$ and CuCl, however, are not quite as hygroscopic. Attention should also be given to the sublimation property of $FeCl_3$.

All of the compounds satisfy condition (3), low price, except $PtCl_2$. The price of this compound, however, can be cut in half if Pt is recovered.

The most desirable metallic chlorides for the HCl supply in the XeCl excimer laser are $PdCl_2$ and AgCl. Since, however, it is not difficult to handle hygroscopic substances when they are not in contact with moisture, most of the above compounds can be used.

I claim:

1. A rare gas halide excimer laser comprising
    (a) a chamber defining a laser cavity;
    (b) means for supplying the rare gas and hydrogen gas to the cavity;
    (c) a gas recirculation loop defining a flow path extending from and contiguous with a first end of the laser cavity to a second end of the laser cavity;
    (d) gas flow control means effective to cause gas to flow out of the laser cavity through the flow path defined by the recirculation loop and back into the laser cavity; and
    (e) a hydrogen chloride generator disposed within the recirculation loop such that gas flow through the loop passes through the hydrogen chloride generator, said hydrogen chloride generator comprising means for producing hydrogen chloride gas from hydrogen gas present in the gas flow and a reactant in the chamber.

2. An excimer laser according to claim 1, wherein the hydrogen chloride generator comprises a heated chamber contiguous with the flow path of the recirculation loop and a holder for a solid reactant disposed within the heated chamber.

3. An excimer laser according to claim 2, further comprising a cold trap disposed within the recirculation loop downstream from the hydrogen chloride generator.

4. An excimer laser according to claim 3, further comprising a filter to remove particulate matter from the gas flow disposed downstream from the cold trap.

5. An excimer laser according to claim 2, wherein the means for supplying the rare gas and hydrogen gas to the cavity comprises a flow control value which is attachable to a gas supply line.

6. An excimer laser according to claim 2, wherein the holder contains a material selected from the group consisting of platinum chloride, palladium chloride, ferric chloride, cupric chloride, nickel chloride, silver chloride, cuprous chloride, ruthenium chloride and rhodium chloride.

7. An excimer laser according to claim 2, wherein the holder contains palladium chloride.

8. An excimer laser according to claim 2, wherein the holder contains silver chloride.

* * * * *